(12) United States Patent
Heo

(10) Patent No.: US 8,560,967 B2
(45) Date of Patent: Oct. 15, 2013

(54) MOBILE TERMINAL AND METHOD OF PROVIDING INFORMATION USING THE SAME

(75) Inventor: Keunjae Heo, Seoul (KR)

(73) Assignee: LG Electronics Inc., Seoul (KR)

(*) Notice: Subject to any disclaimer, the term of this patent is extended or adjusted under 35 U.S.C. 154(b) by 59 days.

(21) Appl. No.: 12/764,825

(22) Filed: Apr. 21, 2010

(65) Prior Publication Data

US 2011/0107226 A1    May 5, 2011

(30) Foreign Application Priority Data

Nov. 5, 2009    (KR) .................. 10-2009-0106528

(51) Int. Cl.
*G06F 3/048*    (2013.01)
(52) U.S. Cl.
USPC ......................................... 715/838; 715/802
(58) Field of Classification Search
USPC ......................................... 715/802, 736, 838
See application file for complete search history.

(56) References Cited

U.S. PATENT DOCUMENTS

| | | | |
|---|---|---|---|
| 5,918,014 A | 6/1999 | Robinson | |
| 6,613,101 B2* | 9/2003 | Mander et al. ............... | 715/273 |
| 7,065,713 B1* | 6/2006 | Dutta et al. ................... | 715/768 |
| 7,424,476 B2* | 9/2008 | Apparao et al. .............. | 1/1 |
| 7,730,416 B2* | 6/2010 | Ueda et al. .................... | 715/788 |
| 8,051,388 B2* | 11/2011 | Toki .............................. | 715/838 |
| 2003/0231216 A1* | 12/2003 | McBrearty et al. ........... | 345/855 |
| 2006/0161870 A1* | 7/2006 | Hotelling et al. ............. | 715/863 |
| 2006/0224997 A1* | 10/2006 | Wong et al. ................... | 715/838 |
| 2007/0162298 A1* | 7/2007 | Melton et al. ................. | 705/1 |
| 2008/0028334 A1* | 1/2008 | De Mes ......................... | 715/781 |
| 2008/0133754 A1* | 6/2008 | Smyth et al. .................. | 709/226 |
| 2009/0327913 A1* | 12/2009 | Adar et al. ..................... | 715/745 |
| 2010/0095219 A1* | 4/2010 | Stachowiak et al. .......... | 715/745 |

FOREIGN PATENT DOCUMENTS

CN    101075880 A    11/2007

* cited by examiner

*Primary Examiner* — Omar Abdul-Ali

(74) *Attorney, Agent, or Firm* — Birch, Stewart, Kolasch & Birch, LLP

(57) ABSTRACT

A mobile terminal including a display unit configured to display information; a wireless Internet module configured to wirelessly access the Internet; and a controller configured to display an Internet access history including web page images of captured web pages previously accessed through the wireless Internet module in a first area of the display unit, to group the web page images by categories, and to display the grouped web page images in the first area.

22 Claims, 20 Drawing Sheets

MOBILE TERMINAL AND METHOD OF PROVIDING INFORMATION USING THE SAME

The present application claims priority to Korean Application No. 10-2009-0106528 filed in Korea on Nov. 5, 2009, the entire contents of which are hereby incorporated by reference in their entirety.

BACKGROUND OF THE INVENTION

1. Field of the Invention

The present invention relates to a mobile terminal and corresponding method for efficiently providing a history of accessed contents such as web pages or files.

2. Discussion of the Related Art

Mobile terminals now provide many additional functions besides the basic call function. For example, mobile terminals now allow users to access web sites/web pages, view and play multimedia contents, etc. However, information provided about accessed web sites/web pages is limited in nature, which results in an inconvenience to the user.

SUMMARY OF THE INVENTION

Accordingly, one object of the present invention is to address the above-noted and other problems of the related art.

Another object of the present invention is to provide a mobile terminal and corresponding method for efficiently providing a history of accessed contents such as web pages or files.

To achieve these and other advantages and in accordance with the purpose of the present invention, as embodied and broadly described herein, the present invention provides in one aspect a mobile terminal including a display unit configured to display information; a wireless Internet module configured to wirelessly access the Internet; and a controller configured to display an Internet access history including web page images of captured web pages previously accessed through the wireless Internet module in a first area of the display unit, to group the web page images by categories, and to display the grouped web page images in the first area.

In another aspect, the present invention provides a method of controlling a mobile terminal, and which includes wirelessly accessing, via a wireless Internet module, the Internet; displaying, on a display unit of the mobile terminal, an Internet access history including web page images of captured web pages previously accessed through the wireless Internet module in a first area of the display unit; and grouping, via a controller on the mobile terminal, the web page images by categories, and controlling the display unit to display the grouped web page images in the first area.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this Detailed Description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
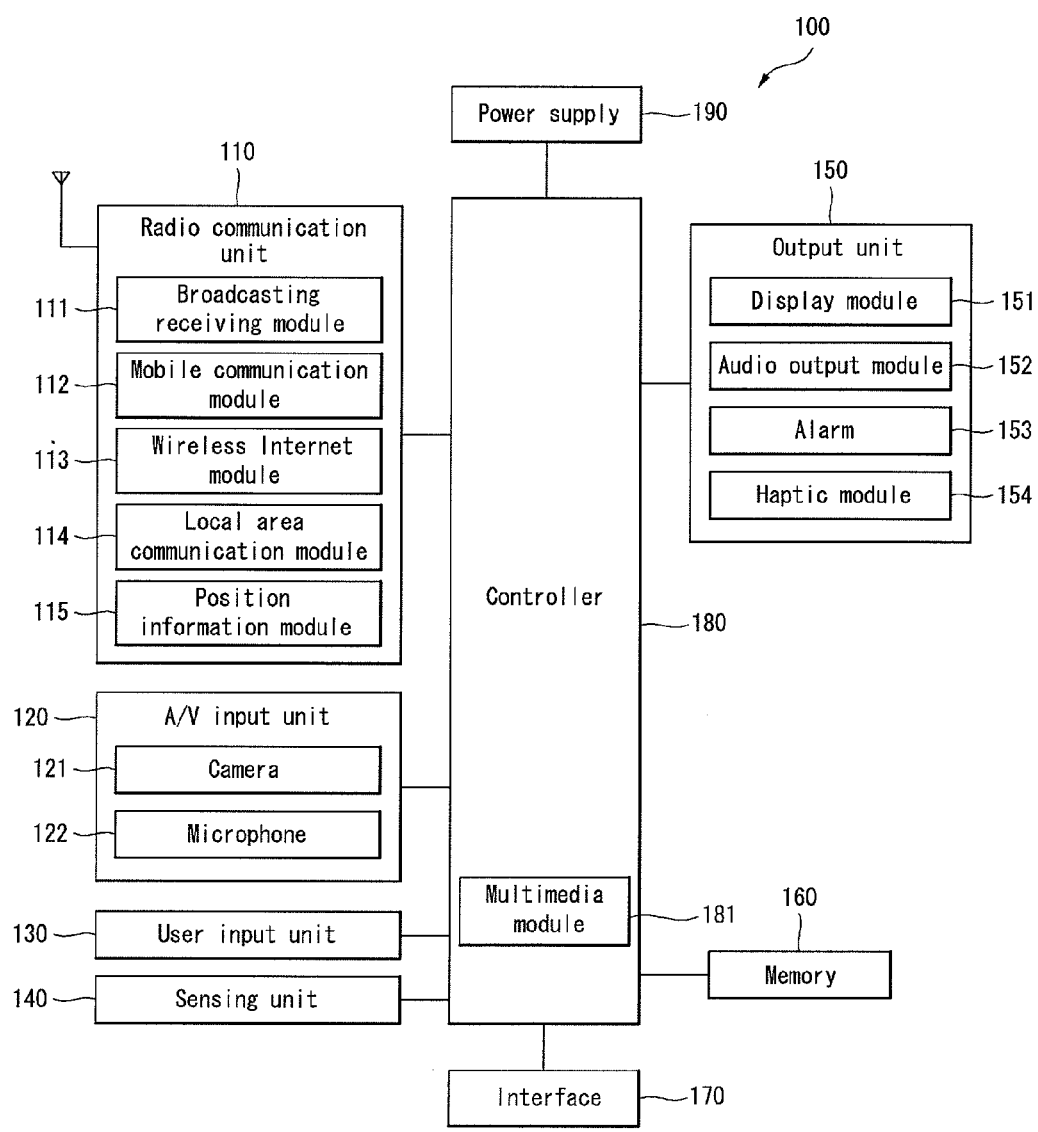
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190.

In addition, the radio communication unit 110 includes at least one module that enables radio communication between the mobile terminal 100 and a radio communication system or between the mobile terminal 100 and a network in which the mobile terminal 100 is located. For example, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Also, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal.

Further, the broadcasting signals can include not only TV broadcasting signals, radio broadcasting signals and data broadcasting signals, but also signals in the form of combination of a TV broadcasting signal and a radio broadcasting signal. In addition, the broadcasting related information can be information on a broadcasting channel, a broadcasting program or a broadcasting service provider, and can be provided even through a mobile communication network. In the latter case, the broadcasting related information can be received by the mobile communication module 112.

Also, the broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) systems, etc. The broadcasting receiving module 111 can also be constructed to be suited to broadcasting systems providing broadcasting signals other than the above-described digital broadcasting systems.

Further, the broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

In addition, the wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

Also, the local area communication module 114 corresponds to a module for local area communication. Further, bluetooth, radio frequency identification (RFID), infrared data association (IrDA), ultra wideband (UWB) and ZigBee can be used as a local area communication technique.

The position information module 115 confirms or obtains the position of the mobile terminal. In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time.

Furthermore, a method of calculating position and time information using three satellites and correcting the calculated position and time information using another satellite can also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display module 151 (hereinafter referred to as display 151).

Also, the image frames processed by the camera 121 can be stored in the memory 160 or transmitted to an external device through the radio communication unit 110. The mobile terminal 100 can also include at least two cameras. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on.

Also, the sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100.

For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can also include a proximity sensor.

In addition, the output unit 150 generates visual, auditory or tactile output and can include the display 151, an audio output module 152, an alarm 153 and a haptic module 154. Further, the display 151 displays information processed by the mobile terminal 100. For example, the display 151 displays a user interface (UI) or graphic user interface (GUI) related to a telephone call when the mobile terminal is in the call mode. The display 151 also displays a captured or/and received image, UI or GUI when the mobile terminal 100 is in the video telephony mode or the photographing mode.

In addition, the display 151 can include at least one of a liquid crystal display, a thin film transistor liquid crystal display, an organic light-emitting diode display, a flexible display and a three-dimensional display. Further, some of these displays can be of a transparent type or a light transmission type. That is, the display 151 can include a transparent display.

In more detail, the transparent display includes a transparent liquid crystal display. Further, the rear structure of the display 151 can also be of the light transmission type. Accordingly, a user can see an object located behind the body of the mobile terminal 100 through the transparent area of the body of the mobile terminal 100, which is occupied by the display 151.

The mobile terminal 100 can also include at least two displays 151. For example, the mobile terminal 100 can include a plurality of displays that are arranged on a single face at a predetermined distance or integrated displays. The plurality of displays can also be arranged on different sides.

In addition, when the display 151 and a sensor sensing touch (referred to as a touch sensor hereinafter) form a layered structure, which is referred to as a touch screen hereinafter, the display 151 can be used as an input device in addition to an output device. The touch sensor can be in the form of a touch film, a touch sheet and a touch pad, for example.

Further, the touch sensor can be constructed to convert a variation in pressure applied to a specific portion of the display 151 or a variation in capacitance generated at a specific portion of the display 151 into an electric input signal. The touch sensor can also be constructed to sense pressure of touch as well as the position and area of the touch.

Also, when the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor of the sensing unit 140 can be located in an internal region of the mobile terminal, surrounded by the touch screen, or near the touch screen. The proximity sensor senses an object approaching a predetermined sensing face or an object located near the proximity sensor using an electromagnetic force or infrared rays without having mechanical contact. Further, the proximity sensor has lifetime longer than that of a contact sensor and thus has a wide application in the mobile terminal 100.

In addition, the proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. Further, a capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer touches the touch screen.

Further, the proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc.

In addition, the alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display 151 or the audio output module 152.

Also, the haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can also not only transmit haptic effects through direct contact but also allow the user to feel haptic effects through a kinesthetic sense of the user's fingers or arms. The mobile terminal 100 can also include multiple haptic modules 154.

In addition, the memory 160 can store a program for the operation of the controller 180 and temporarily store input/output data (for example, phone book, messages, still images, moving images, etc.). The memory 160 can also store data about vibrations and sounds in various patterns, which are output from when a touch input is applied to the touch screen.

Further, the memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, an earphone port, etc., for example.

In addition, the interface 170 can also interface with a user identification module that is a chip that stores information for authenticating the authority to use the mobile terminal 100. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

In addition, the controller 180 controls the overall operations of the mobile terminal. For example, the controller 180 performs control and processing for voice communication, data communication and video telephony. As shown in FIG. 1, the controller 180 also includes a multimedia module 181 for playing multimedia. Also, the multimedia module 181 can be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Embodiments of the present invention can be implemented in a computer or similar device readable recording medium by using software, hardware or a combination thereof, for example.

According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
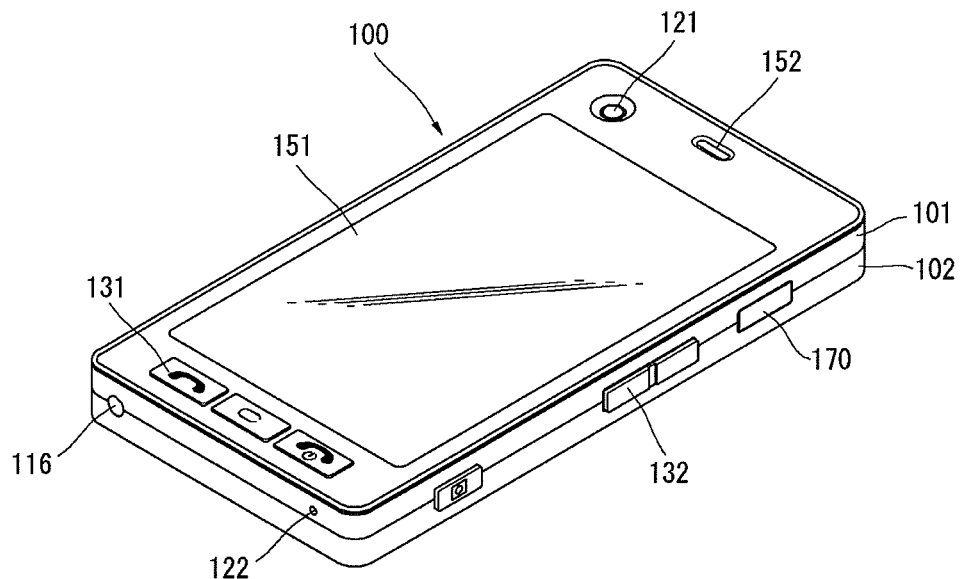
FIG. 2A is a front perspective view of a mobile terminal or a handheld terminal according to an embodiment of the present invention

Next, FIG. 2A is a front perspective view of a mobile terminal or a handheld terminal 100 according to an embodiment of the present invention. In this example, the handheld terminal 100 is a bar type terminal body. However, the present invention is not limited to a bar type terminal and can be applied to terminals of various types including slide type, folder type, swing type and swivel type terminals.

In addition, the terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case can also be additionally arranged between the front case 101 and the rear case 102. Also, the cases can be formed of plastics through injection molding or made of a metal material such as stainless steel (STS) or titanium (Ti).

As shown in FIG. 2A, the display 151, the audio output unit 152, the camera 121, user input units 131 and 132, the microphone 122 and the interface 170 are arranged in the terminal body, specifically, in the front case 101. In addition, the display 151 occupies most of the main face of the front case 101.

Further, the audio output unit 152 and the camera 121 are arranged in a region in proximity to one of both ends of the display 151. Also, the user input unit 131 and the microphone 122 are located in a region in proximity to the other end of the display 151. Also include is another user input unit 132, which is arranged with the interface 170 on the sides of the front case 101 and the rear case 102.

Thus, in this embodiment, the user input unit 130 includes multiple operating units 131 and 132 that are operated to receive commands for controlling the operation of the handheld terminal 100. Further, the operating units 131 and 132 can be referred to as manipulating portions and employ any tactile manner in which a user operates the operating units 131 and 132 while producing a tactile feeling.

Also, the operating units 131 and 132 can receive various inputs. For example, the operating unit 131 receives commands such as start and end a call, and the operating unit 132 receives commands such as to control the volume of the sound output from the audio output unit 152 or to convert the display unit 151 into a touch recognition mode.

Figure 2B:
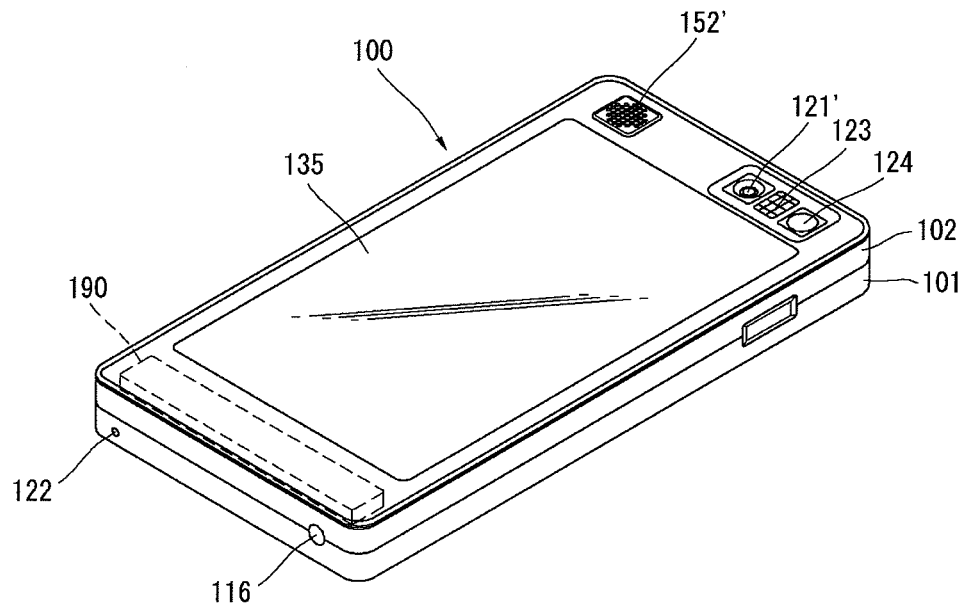
FIG. 2B is a rear perspective view of the handheld terminal shown in FIG. 2A.

Next, FIG. 2B is a rear perspective view of the handheld terminal shown in FIG. 2A according to an embodiment of the present invention. As shown in FIG. 2B, a camera 121' is additionally attached to the rear side of the terminal body, that is, the rear case 102. In this configuration, the camera 121' has a photographing direction that is opposite to that of the camera 121 shown in FIG. 2A and can have pixels different from those of the camera 121 shown in FIG. 2A.

For example, it is preferable that the camera 121 has low pixels such that it can capture an image of the face of a user and transmit the image to a receiving part during video telephony while the camera 121' has high pixels such that it can capture an image of a general object and does not immediately transmit the image in many situations. The cameras 121 and 121' can also be attached to the terminal body such that they can be rotated or popped-up.

As shown in FIG. 2B, a flash bulb 123 and a mirror 124 are additionally arranged in proximity to the camera 121'. The flash bulb 123 lights an object when the camera 121' takes a picture of the object, and the mirror 124 is used for the user to look at his or her face when the user wants to take a picture of themselves using the camera 121'.

An audio output unit 152' is also additionally provided on the rear side of the terminal body. In this embodiment, the audio output unit 152' can achieve a stereo function with the audio output unit 152 shown in FIG. 2A and be used in a speaker phone mode when the terminal is used for a telephone call.

A broadcasting signal receiving antenna 116 can also be additionally attached to a side of the terminal body in addition to an antenna for telephone calls. The antenna 116 forming a part of the broadcasting receiving module 111 shown in FIG. 1 can be set in the terminal body such that the antenna can be pulled out of the terminal body.

In addition, the power supply 190 for providing power to the handheld terminal 100 is set in the terminal body, and can be included in the terminal body or detachably attached to the terminal body. FIG. 2B also illustrates a touch pad 135 for sensing touch additionally attached to the rear case 102 of the terminal 100. Further, the touch pad 135 can be a light transmission type as the display 151. In this instance, when the display 151 outputs visual information through both sides, the visual information can be recognized through the touch pad 135.

Also, the information output through both sides of the display 151 can be controlled by the touch pad 135. In addition, a display can be additionally attached to the touch pad 135 such that a touch screen can be arranged even in the rear case 102. Further, the touch pad 135 operates in connection with the display module 151 of the front case 101, and can be located in parallel with the display 151 behind the display 151. The touch panel 135 can also be identical to or smaller than the display 151 in size.

The interoperations of the display 151 and the touch pad 135 will now be described with reference to FIGS. 3A and 3B. In more detail, FIGS. 3A and 3B are front views of the handheld terminal 100 and are used for explaining an operating state of the handheld terminal according to an embodiment of the present invention.

The display 151 can display various types of visual information in the form of characters, numerals, symbols, graphic or icons. To input the information, at least one of the characters, numerals, symbols, graphic and icons are displayed in predetermined arrangement in the form of a keypad. Also, the keypad can be referred to as a 'soft key'.

Figure 3A:
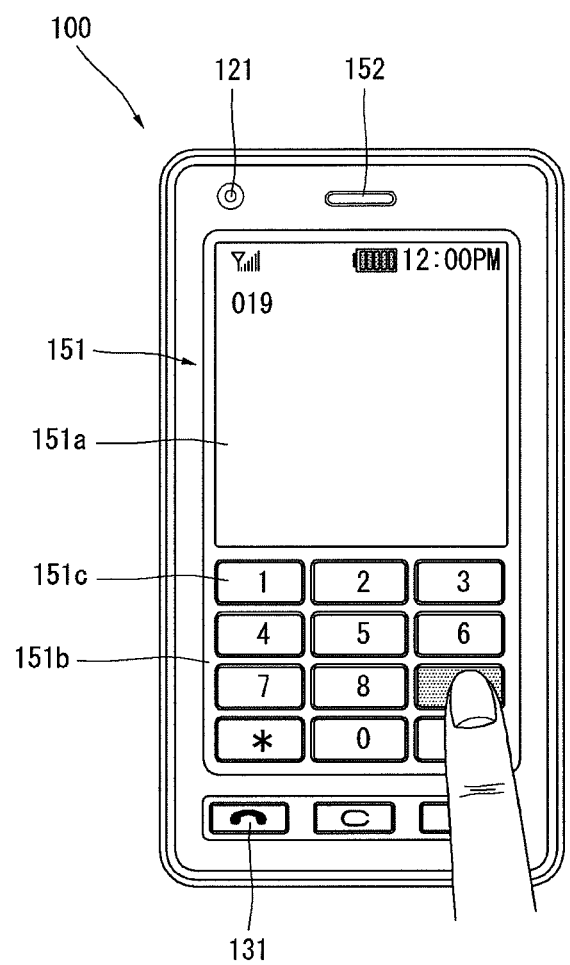
FIGS. 3A and 3B are front views of the handheld terminal illustrating an operating state of the handheld terminal according to an embodiment of the present invention.
Figure 3B:
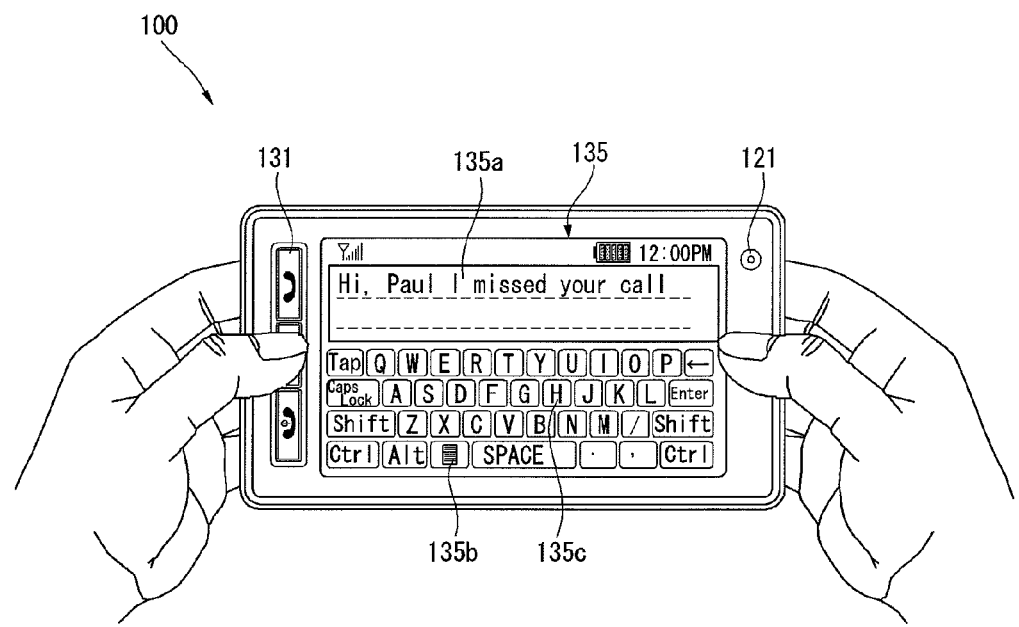

Further, FIG. 3A shows that touch applied to a soft key is input through the front side of the terminal body. The display 151 can be a single area or can be divided into a plurality of regions. In the latter instance, the display 151 is constructed such that the plurality of regions interoperate with each other.

For example, and as shown in FIG. 3A, an output region 151a and an input region 151b are respectively displayed in upper and lower parts of the display 151. The input region 151b displays soft keys 151c that represent numerals used to input numbers such as telephone numbers. Thus, when a soft key 151c is touched, a numeral corresponding to the touched soft key is displayed on the output region 151a. Further, when the user operates the first operating unit 131, the controller 180 attempts a connection of a call corresponding to a telephone number displayed on the output region 151a.

Next, FIG. 3B is an overview of the mobile terminal 100 showing that touch applied to soft keys is input through the rear side of the terminal body. FIG. 3B also shows the landscape of the terminal body while FIG. 3A shows the portrait of the terminal body. In addition, the display 151 is constructed such that an output image is converted according to the direction in which the terminal body is located.

Further, FIG. 3B shows the operation of the handheld terminal in a text input mode. As shown, the display 151 includes the touch pad display 135 having an output region 135a and an input region 135b. A plurality of soft keys 135c indicating at least one of characters, symbols and numerals are also arranged in the input region 135b. Further, in this embodiment, the soft keys 135c are arranged in the form of QWERTY keys.

Thus, when the soft keys 135c are touched through the touch pad 135, the characters, numerals and symbols corresponding to the touched soft keys 135c are displayed on the output region 135a. Touch input through the touch pad 135 can prevent the soft keys 135c from being covered with user's fingers when the soft keys 135c are touched as compared to touch input through the display 151. Further, when the display 151 and the touch pad 135 are transparent, the user can see his or her fingers located behind the terminal body, and thus can select items by touching the backside or surface of the displayed keys 135c.

In addition, the user can scroll the display 151 or the touch pad 135 to move an object displayed on the display 151, for example, by using a cursor or a pointer located on an icon. Also, when the user moves his or her finger on the display 151 or the touch pad 135, the controller 180 can visually display the user's finger moving path on the display 151. This is useful to edit an image displayed on the display 151.

Also, when the display 151 (touch screen) and the touch pad 135 are simultaneously touched within a predetermined period of time, a specific function of the terminal can be executed. For example, the user can clamp the terminal body using their thumb and index finger. This specific function can include activating or deactivating the display 151 or the touch pad 135, for example.

Embodiments of the present invention will now be explained. Further, the display 151 is assumed to be a touch screen. As described above, the touch screen can perform both an information displaying function and an information input function. However, the present invention is not limited thereto. Further, touch can include both contact touch and proximity touch in the specification. The proximity touch will be described in more detail later with reference to FIG. 23.

Figure 4:
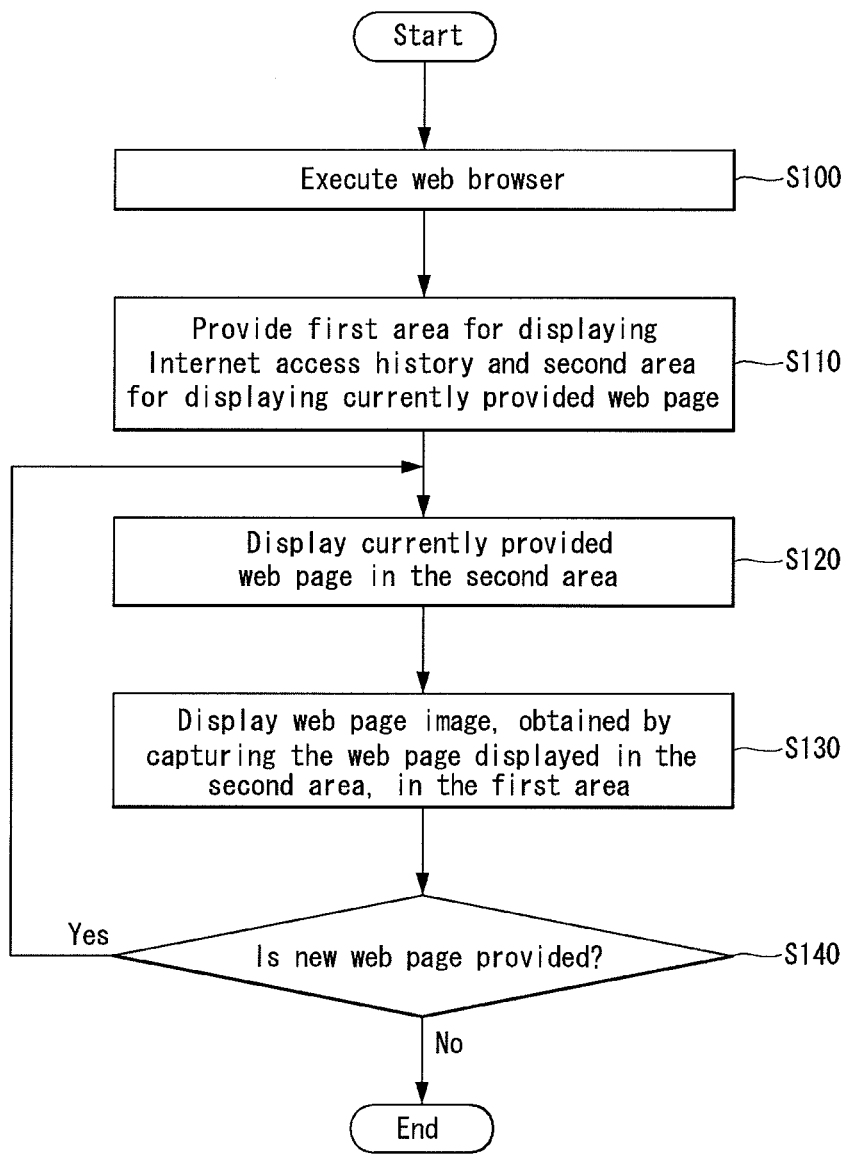
FIG. 4 is a flowchart showing a method of providing information in a mobile terminal according to a first embodiment of the present invention.

Next, FIG. 4 is a flowchart showing a method of providing information in a mobile terminal according to a first embodiment of the present invention. Also, FIGS. 5A 5B, 6-8, 9A and 9B include overviews of display screens when the method in FIG. 4 is performed according to an embodiment of the present invention.

Further, the method of providing information in a mobile terminal according to the first embodiment of the present invention may be implemented in the mobile terminal 100 explained with reference to FIGS. 1, 2A, 2B, 3A and 3B. Thus, FIGS. 1-3 will also be referred to throughout the description of the present invention.

Referring to FIG. 4, the controller 180 executes a web browser according to a command of a user or a predetermined condition (step S100). The controller 180 can also provide a corresponding graphical user interface (GUI) to the display 151 as the web browser is executed. The controller 180 then accesses a predetermined specific web site through the mobile communication module 112 or the wireless Internet module 113 as the web browser is initially executed and provides a web page supplied from the accessed web site to the display 151.

Figure 5A:
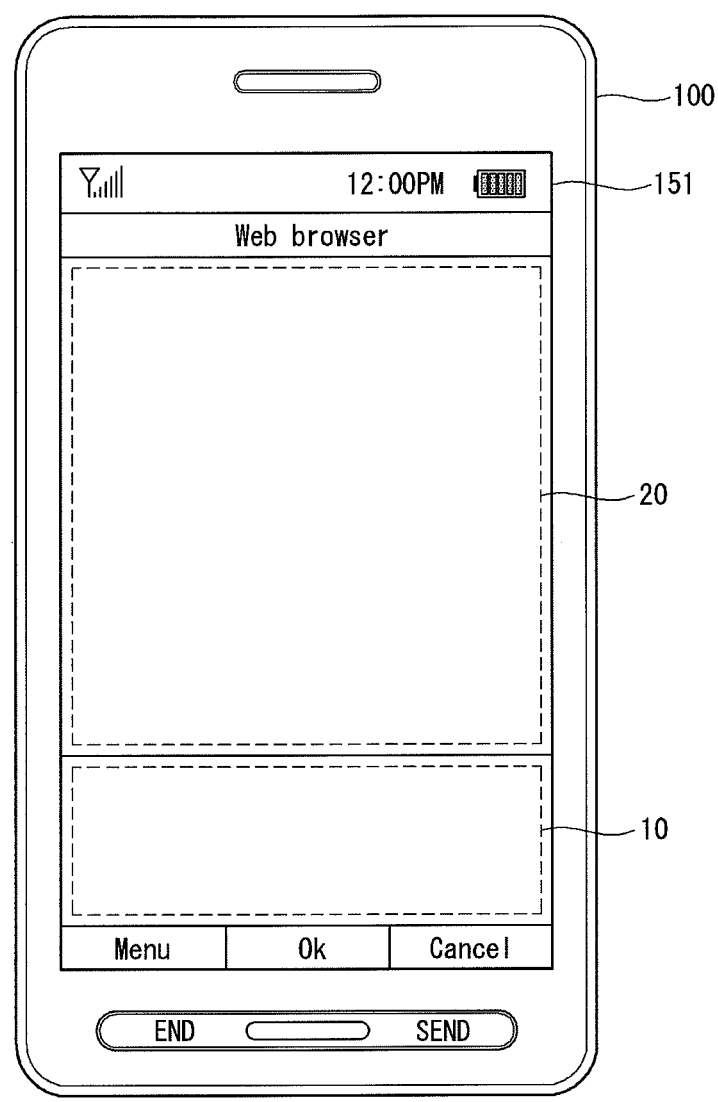
FIGS. 5A and 5B are overviews of display screens of a mobile terminal according to an embodiment of the present invention.
Figure 5B:
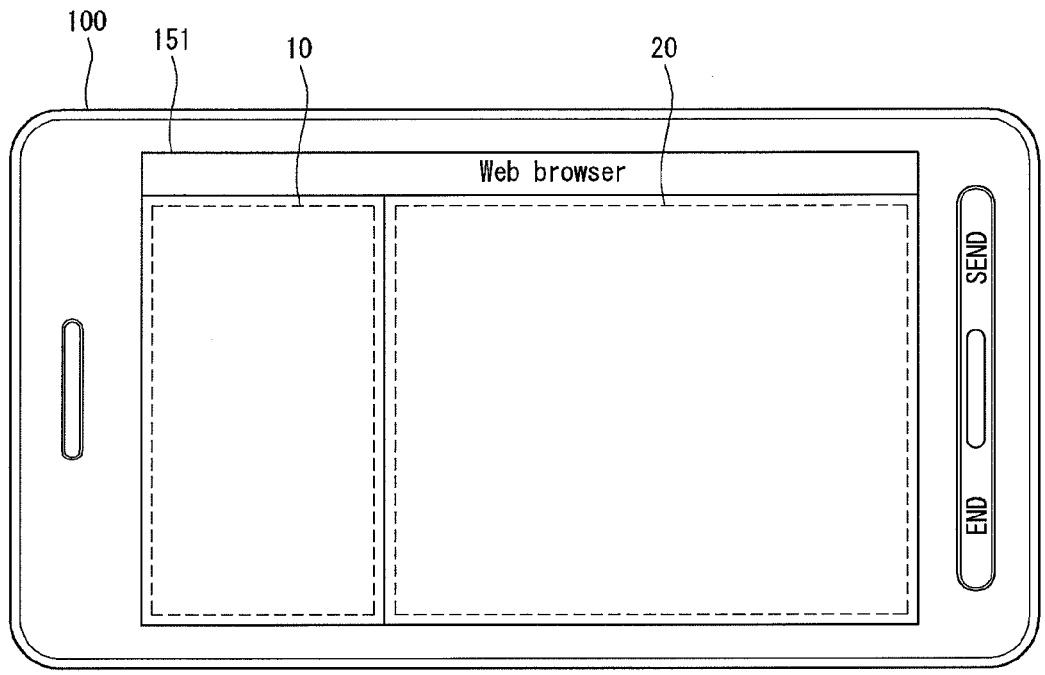

Referring to FIGS. 4, 5A and 5B, the controller 180 provides a first area 10 for displaying an Internet access history and a second area 20 for displaying a currently provided web page to the display 151 (step S110). In addition, the mobile terminal 100 shown in FIG. 5A has a screen in the portrait orientation and the mobile terminal 100 shown in FIG. 5B has a screen in the landscape orientation. That is, the mobile terminal 100 can control the sensing unit 140 to sense an angle between the body of the mobile terminal 100 and the ground to determine the orientation of the body of the mobile terminal 100.

The controller 180 can also access the Internet through the mobile communication module 112 or the wireless Internet module 113 and access a specific web site connected to the Internet. Further, the controller 180 displays a web page currently provided by the accessed web site in the second area 20 (step S120) and displays a web page image, obtained by capturing the web page displayed in the second area 20, in the first area 10 (step S130).

Figure 6:
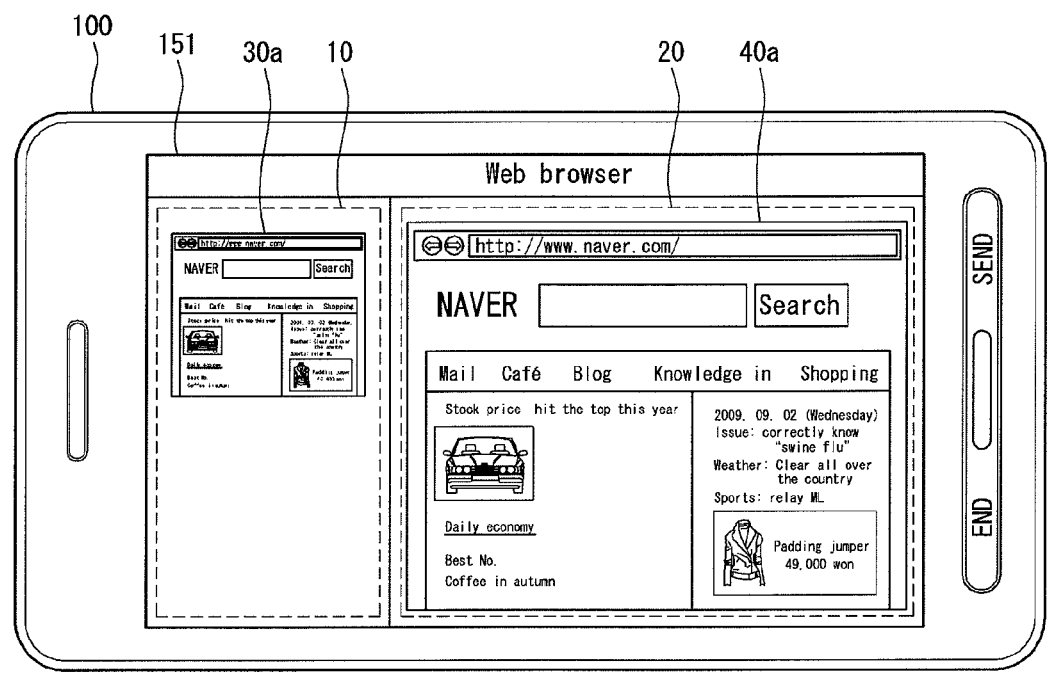
FIGS. 6-8, 9A and 9B are overviews of display screens of a mobile terminal according to an embodiment of the present invention.

Referring to FIG. 6, the controller 180 can display a currently provided first web page 40a in the second area 20 and display a first web page image 30a obtained by capturing the web page 40a in the first area 10. As shown in FIG. 6, the first web page 40a is a web page corresponding to "http://www.naver.com", which is a search program.

The controller 180 then determines whether a new web page is provided through the mobile communication module 112 or the wireless Internet module 113 (step S140) and returns the routine to step S120 when the new web page is provided.

Figure 7:
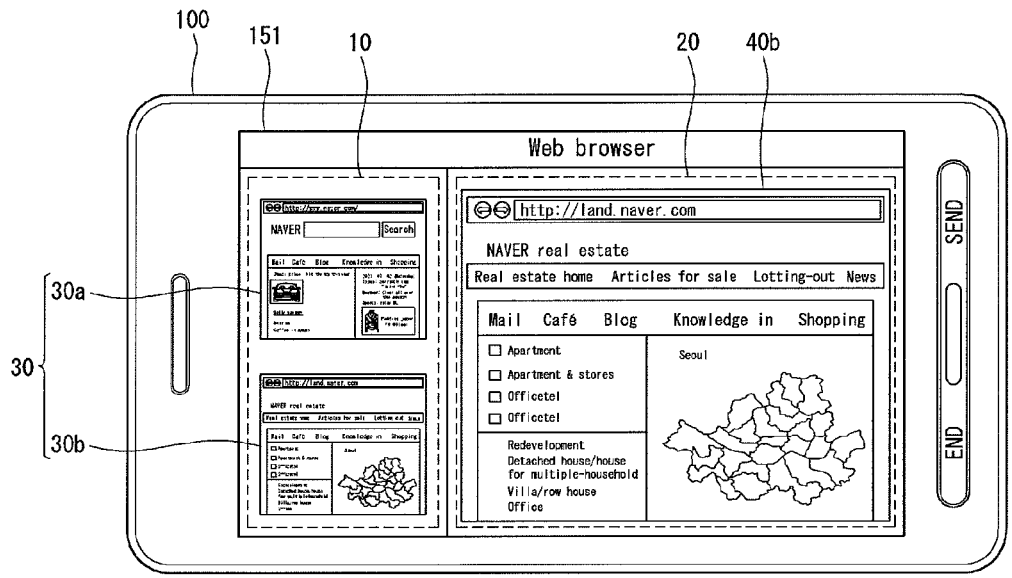

That is, referring to FIG. 7, the controller 180 can be provided with a second web page 40b, which is different from the first web page 40a, from a corresponding web site according to a user's operation and display the second web page 40b in the second area 20 (step S120). Further, the controller 180 can display a second web page image 30b obtained by capturing the second web page 40b in the first area 10 (step S130).

The controller 180 can also provide the second web page image 30b together with the first web page image 30a corresponding to the previously accessed first web page 40a to the first area 10. In addition, the first web page image 30a and the second web page image 30b displayed in the first area 10 compose a history of web pages provided through the Internet, that is, an Internet access history.

Figure 8:
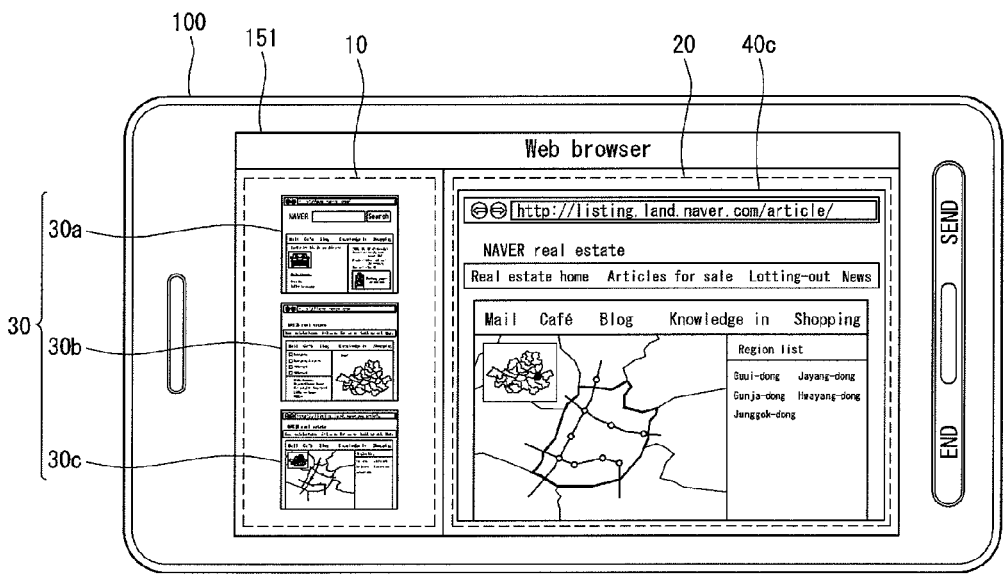

Next, FIG. 8 is an overview of a display screen when a new web page is provided through the Internet in the state of FIG. 7. Referring to FIG. 8, the controller 180 is provided with a third web page 40c different from the second web page 40b and displays the third web page 40c in the second area 20 in step S120. In addition, the controller 180 provides a third web page image 30c corresponding to the third web page 40c to the first area 10 as the Internet access history in step S130.

In the above-described embodiment, a web page image corresponding to a specific web page may be provided to the first area 10 at the same time when the specific web page is provided to the second area 20 or right before or right after the specific web page is provided to the second area 20. However, the time when the web page image is provided to the first area 10 is not limited thereto.

For example, referring to FIGS. 7 and 8, the controller 180 may not provide the second web page image 30b to the first area 10 while the second web page 40b is provided to the second area 20. Further, the controller 180 may provide the second web page image 30b to the first area 10 as a new web page, that is, the third web page 40c, is provided to the second area 20.

Moreover, the first area 10 and the second area 20 are simultaneously provided to the display 151 in the above-described embodiment. However, it is not required to simultaneously display the first area 10 and the second area 20. For example, the first area 10 may be provided to the display 151 only when a predetermined condition is satisfied.

Figure 9A:
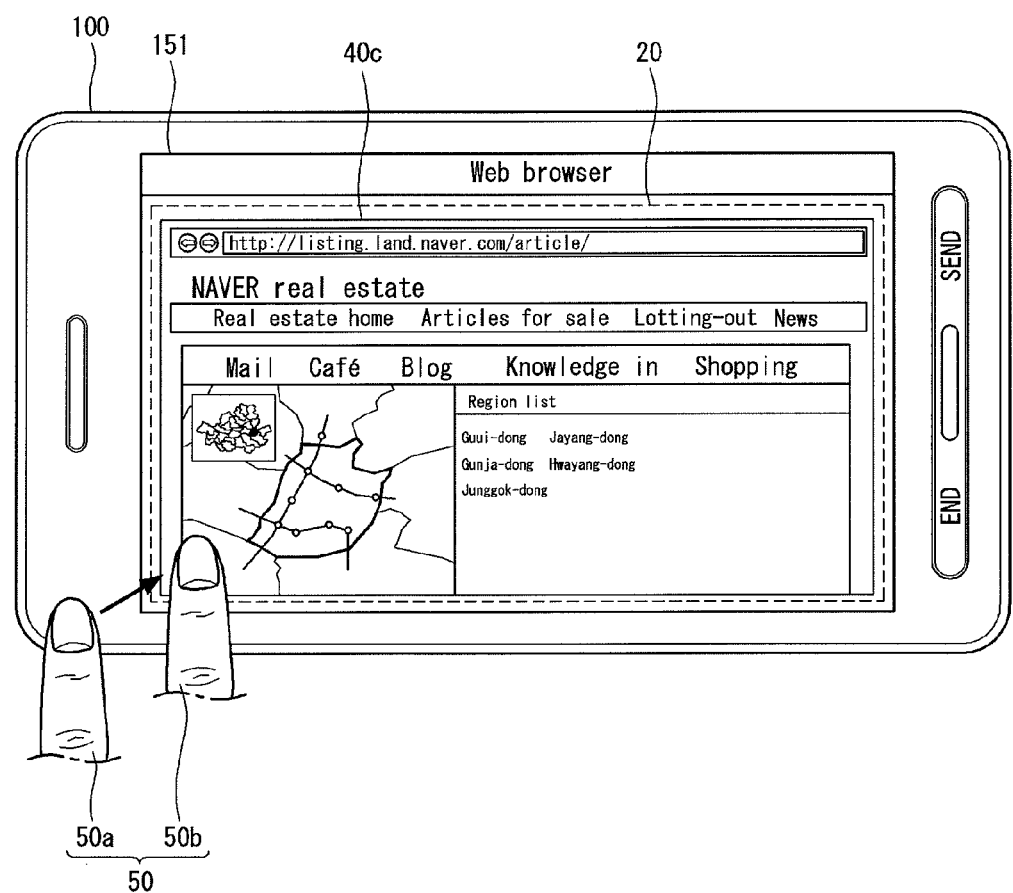
Figure 9B:
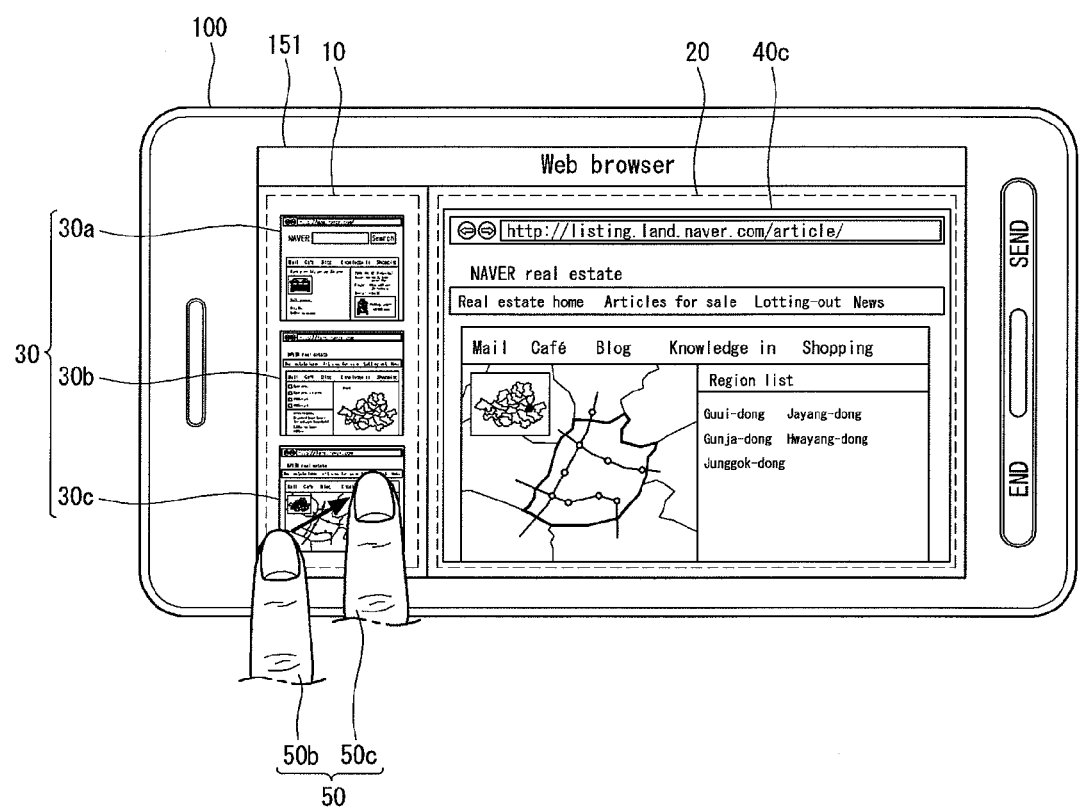

Referring to FIG. 9A, the controller 180 can display the currently provided third web page 40c on the display 151. Here, the first area 10 is not provided to the display unit 151. The controller 180 can also sense proximity of an external object such as the user's finger, which does not come into contact with the display 151, to the display 151. Referring to FIG. 9B, the controller 180 can provide the first area 10 to the display 151 when a finger 50 moves to a third point 50c from a second point 50b. Further, the controller 180 may not provide the first area 10 to the display 151 and provide only the second area 20 to the display 151 if the finger is not sensed anymore.

Figure 10:
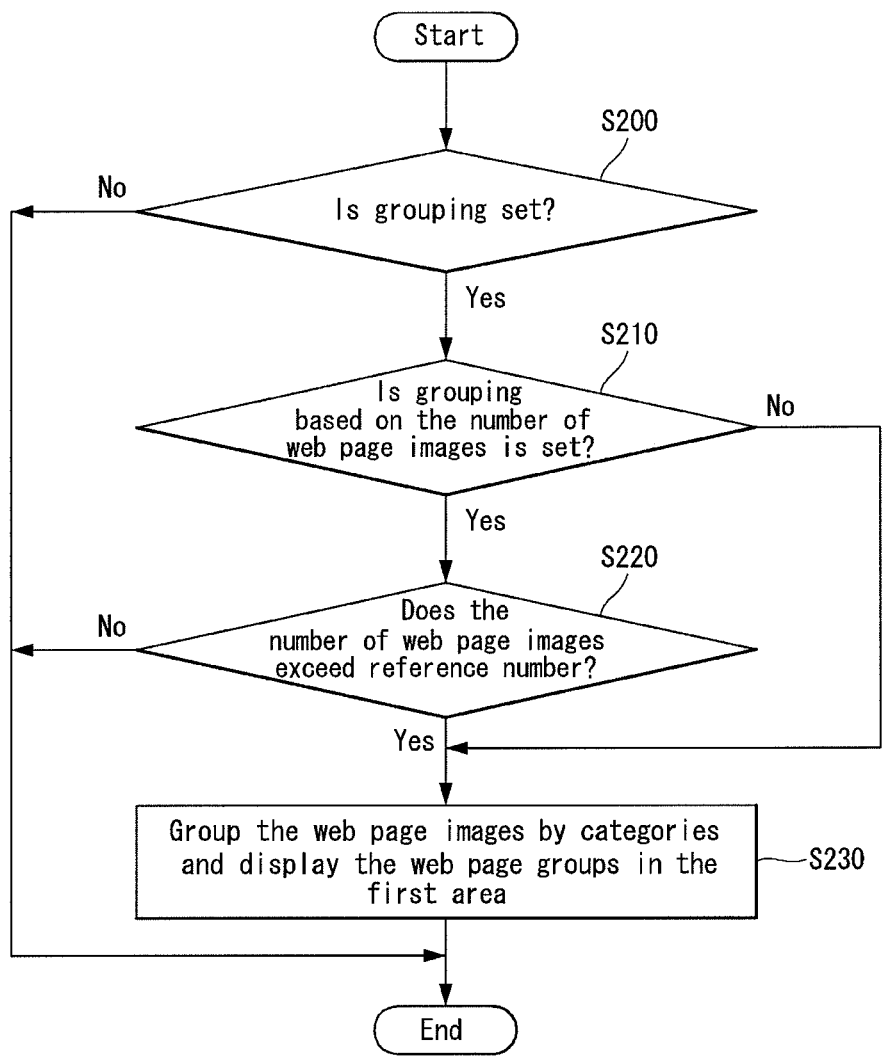
FIG. 10 is a flowchart showing step S130 of FIG. 4 according to an embodiment of the presents invention.

Next, FIG. 10 is a flowchart showing step S130 of FIG. 4 in more detail. Referring to FIG. 10, the controller 180 determines whether a method of providing an Internet access history is set as a grouping method (step S200). The grouping method groups web page images included in the Internet access history by categories according to a predetermined standard, which will be described later.

The controller 180 then determines whether a grouping method based on the number of web page images included in the Internet access history is set (step S210) if the method of providing the Internet access history is set to the grouping method in (Yes in step S200). The controller 180 also determines whether the number of web page images included in the Internet access history exceeds a predetermined reference value (step S220) if the grouping method based on the number of web page images is set (Yes in step S210).

The controller 180 also groups the web page images by categories and displays the grouped web pages in the first area 10 (step S230) if the number of web page images included in the Internet access history exceeds the predetermined reference value (Yes in step S220). Further, the categories may be set based on various standards. For example, the controller 180 can group web page images corresponding to web pages having a same upper Internet protocol address based on Internet protocol addresses of previously or currently provided web pages.

Furthermore, the controller 180 can group web page images corresponding to web pages sequentially provided through a same access route based on access routes of the web pages that were previously provided. The categories can also be set according to various standards and the controller 180 does not always have to perform grouping based on only the Internet protocol address and the access route.

Figure 11:
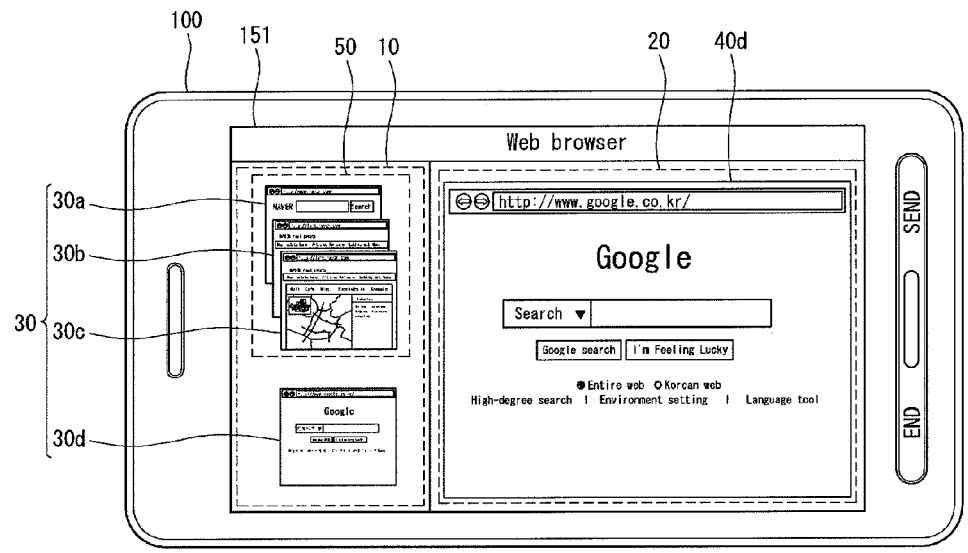
FIG. 11 is an overview of a display screen including another web page received through the Internet and being displayed in a second area from the state of FIG. 8.

Next, FIG. 11 is a display screen illustrating an operation of receiving a fourth web page 40d through the Internet and displaying the fourth web page 40d in the second area 20 from the state of FIG. 8. Referring to FIG. 11, the number of web page images displayed in the first area 10 is four (4) if the reference value is three (3), and thus the web page images can be grouped by categories.

In particular, FIG. 11 shows the web page images included in the Internet access history provided to the first area 10 being grouped based on the Internet protocol address. As shown, a first group 50 includes the first web page image 30a, the second web page image 30b and the third web page image 30c. Further, the first, second and third web page images 30a, 30b and 30c belonging to the first group 50 have the same upper Internet protocol address "www.naver.com". Accordingly, the first, second and third web page images 30a, 30b and 30c are grouped as a single group.

In addition, if the controller 180 determines that the grouping method based on the number of web page images is not set (No in step S210), the controller 180 groups the web page images included in the Internet access history by categories and displays the grouped web page images in the first area 10 (step S230). When the controller 180 performs step S230, the controller 180 can group web page images belonging to the same category irrespective of the number of the web page images included in the Internet access history.

Figure 12A:
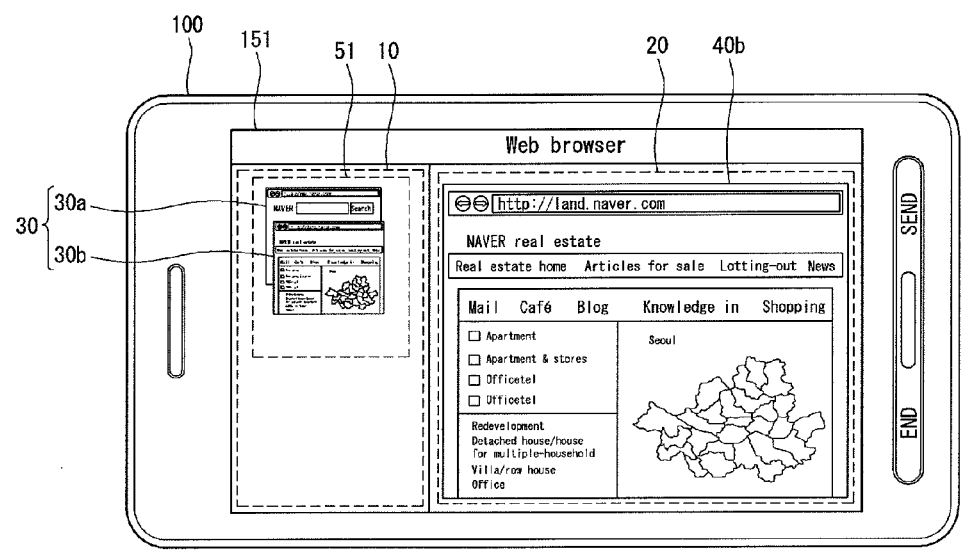
FIGS. 12A and 12B are overviews of display screens on the mobile terminal when step S230 is performed.
Figure 12B:
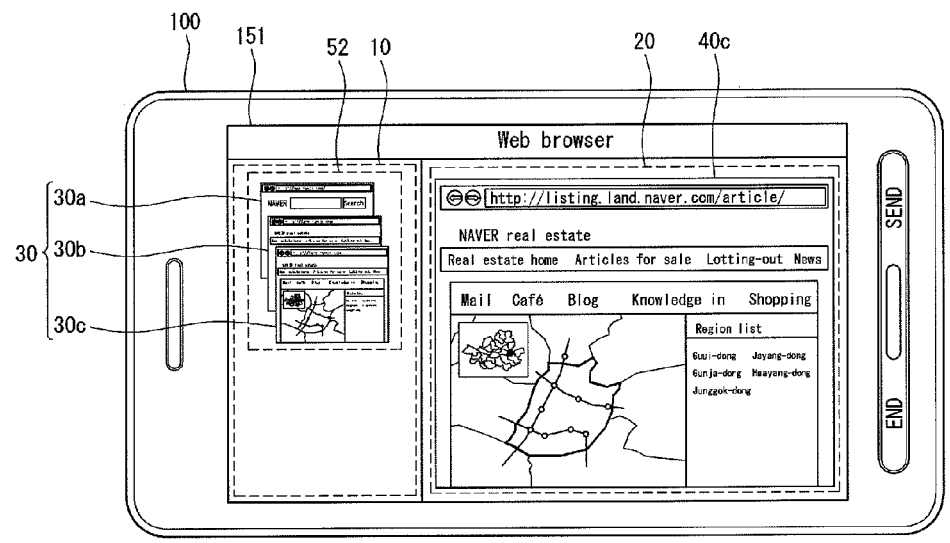

Next, FIGS. 12A and 12B include overviews of display screens on the mobile terminal 100 when step S230 is performed. In particular, FIG. 12A shows a case that a history of web pages accessed by a user includes the first web page 40a and the second web page 40b, and FIG. 12B shows a case that a history of web pages accessed by the user includes the first, second and third web pages 40a, 40b and 40c.

Referring to FIG. 12A, the controller 180 can group the first and second web page images 30a and 30b respectively corresponding to the first and second web pages 40a and 40b into a second group 51, because the first and second web pages 40a and 40b have the same upper Internet protocol address "www.naver.com". Referring to FIG. 12B, the controller 180 can group the first, second and third web page images 30a, 30b and 30c respectively corresponding to the first, second and third web pages 40a, 40b and 40c into a third group 52, because the first, second and third web pages 40a, 40b and 40c have the same upper Internet protocol address.

Figure 13:
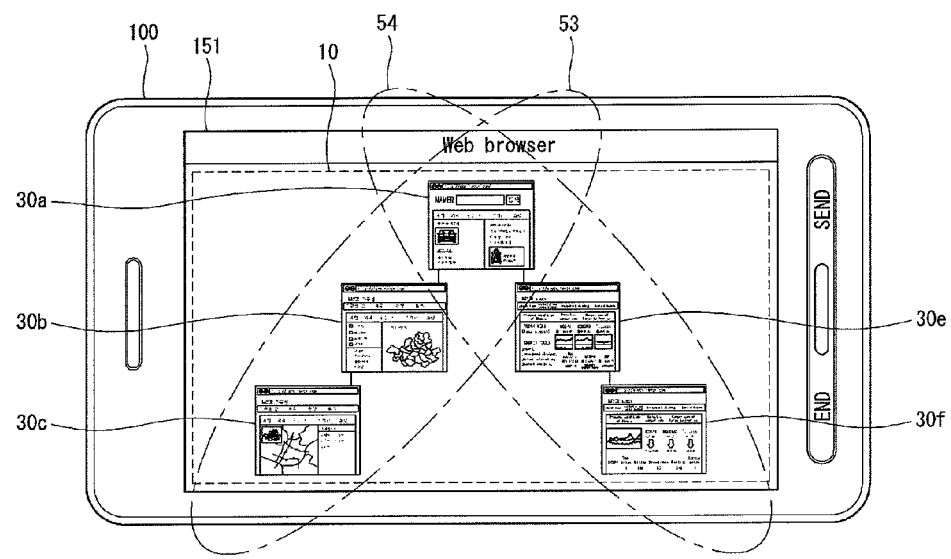
FIG. 13 is an overview of a display screen showing an example of grouping web page images corresponding to web pages having a same upper Internet protocol address.

FIG. 13 shows another example of grouping web page images corresponding to web pages having the same upper Internet protocol address. In FIG. 13, five web page images 30a, 30b, 30c, 30e and 30f correspond to web pages having the same upper Internet protocol address. The web pages 30a, 30b, 30c, 30e and 30f may also be displayed in a tree structure, as shown in FIG. 13. A constellation structure can also be displayed.

In addition, a web page corresponding to the second web image 30b and a web page corresponding to the fifth web page image 30e are lower web pages of a web page corresponding to the first web page image 30a. Further, a web page corresponding to the third web page image 30c is a lower web page of the web page corresponding to the second web page image 30b. In addition, a web page corresponding to the sixth web page image 30f is a lower web page of the web page corresponding to the fifth web page image 30e.

Thus, the controller 180 can group the first, second and third web page images 30a, 30b and 30c into a single group 53 (referred to as "fourth group"), group the first, fifth and sixth web page images 30a, 30e and 30f into a single group 54 (referred to as "fifth group") and provide the fourth and fifth groups 53 and 54 to the first area 10. Further, the controller 180 can group the five web page images 30a, 30b, 30c, 30e and 30f into a single group and display the group.

Also, the controller 180 can group and display web page images in various manners. For example, the controller 180 may overlap a plurality of web page images and display them to represent that the plurality of web page images belong to the same group 50, as shown in FIG. 11. Accordingly, the user can see that the web page images included in the first group 50 belongs to the same group 50.

Moreover, the web page images may be grouped and displayed in a tree structure as shown in FIG. 13. Other methods of grouping web page images can also be provided.

Figure 14:
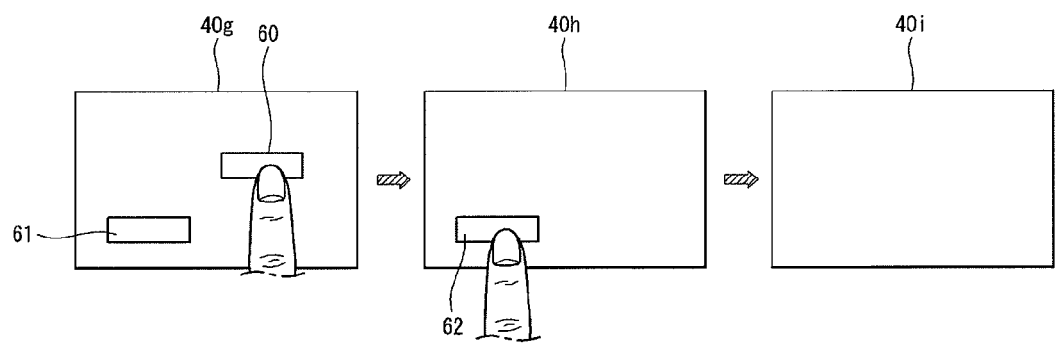
FIGS. 14-17 are overviews of display screens showing an example of grouping web page images based on an access route.

Next, FIGS. 14-17 are overviews of display screens illustrating examples of grouping web page images based on an access route. Referring to FIG. 14, the controller 180 receives a seventh web page 40g from a corresponding web site and displays the seventh web page 40g on the display 151. The seventh web page 40g may include a plurality of contents (60 and 61, for example) respectively having a plurality of link addresses respectively corresponding to other web sites or web pages. The plurality of contents 60 and 61 can also be selected by the user.

Referring to FIG. 14, when the user selects the first contents 60 corresponding to a first link address, the web page or web site corresponding to the first link address is accessed to provide an eighth web page 40h, and the eighth web page 40h is displayed on the display 151. Further, the eighth web page 40h may also include contents corresponding to various link addresses, similarly to the seventh web page 40g.

When the user selects specific contents 62 included in the eighth web page 40h, the controller 180 is provided with a ninth web page 40i having a link address corresponding to the selected contents 62 and displays the ninth web page 40i on the display 151. That is, the seventh, eighth and ninth web pages 40g, 40h and 40i sequentially shown in FIG. 14 construct the same access route.

Figure 15:
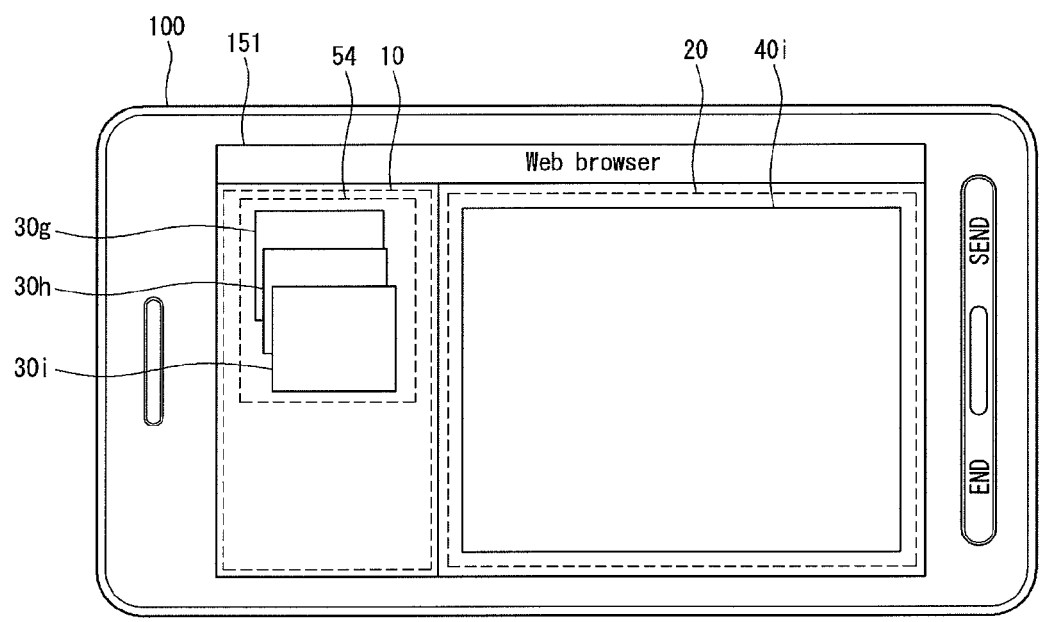

Further, the Internet access history shown in FIG. 14 may be provided to the first area 10 according an embodiment of the present invention. In particular, FIG. 15 shows an example of providing the Internet access history shown in FIG. 14 to the first area 10. Referring to FIG. 15, the controller 180 groups the web pages 40g, 40h and 40i shown in FIG. 14 into a single group 54 and displays the grouped web pages 40g, 40h and 40i, because the web pages 40g, 40h and 40i are sequentially provided through the same access route. Also, the web page images 30g, 30h and 30i shown in FIG. 15 are obtained by respectively capturing the web pages 40g, 40h and 40i shown in FIG. 14.

Figure 16:
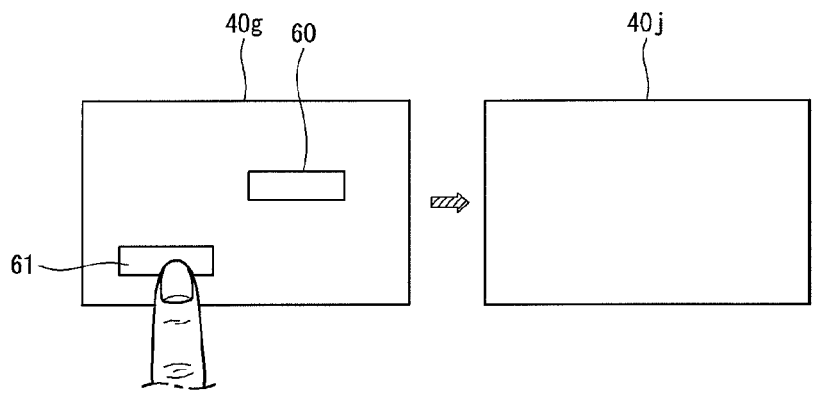
Figure 17:
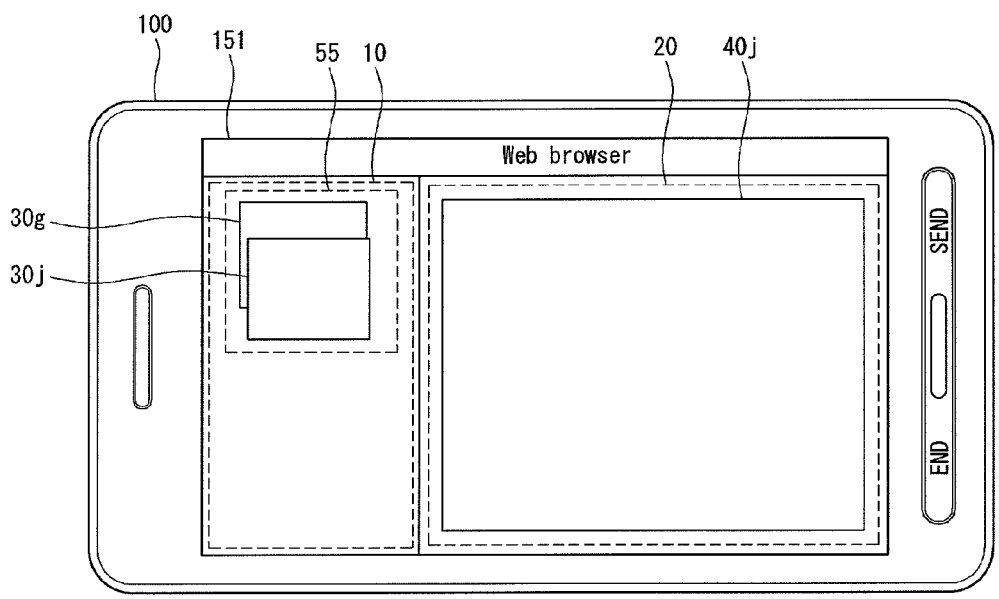

FIG. 16 shows a case that a tenth web page 40j having a link address corresponding to the contents 61 is provided and displayed on the display 151 when the contents 61 included in the seventh web page 40g shown in FIG. 14 are selected. Referring to FIG. 17, the controller 180 groups the web pages 40g and 40j shown in FIG. 16 into a single group 55 (referred to as "sixth group") and displays the web pages in the first area 10, because the web pages 40g and 40j are sequentially provided through the same access route.

The web page images 30g and 30j shown in FIG. 17 are also obtained by capturing the web pages 40g and 40j shown in FIG. 16. Thus, the user can easily access web sites or web pages that were accessed in the past through the Internet access history provided to the first area 10.

Figure 18A:
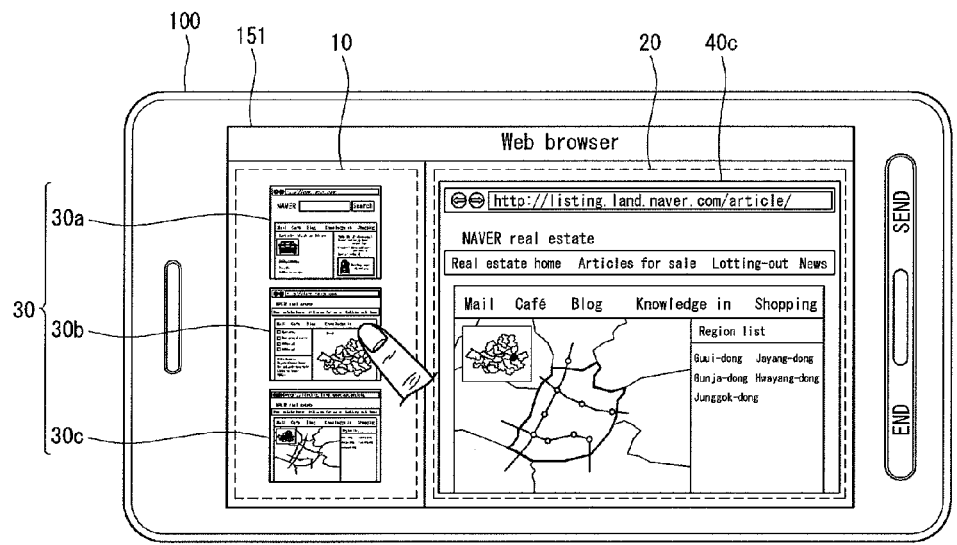
FIGS. 18A and 18B are overviews of display screens showing an example of accessing a web site accessed in the past using an Internet access history.
Figure 18B:
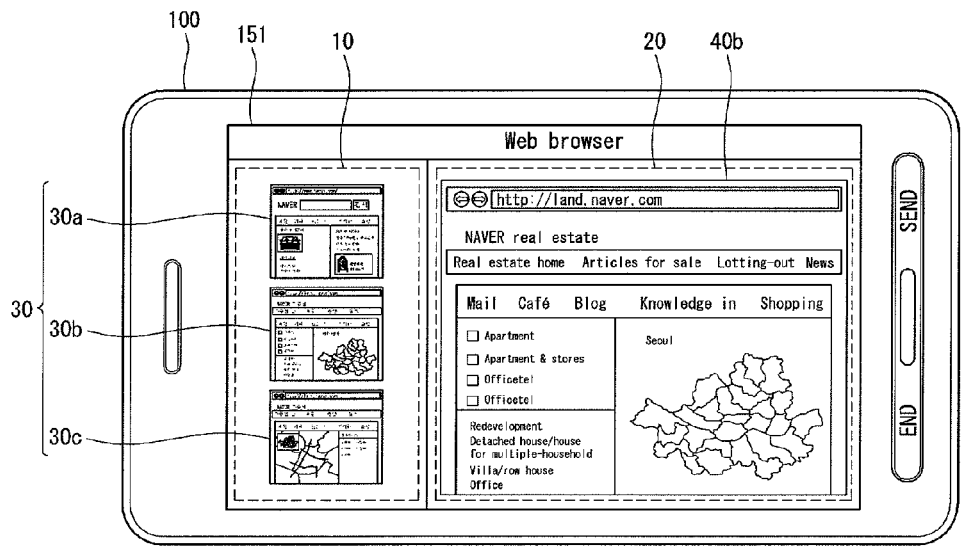

Next, FIGS. 18A and 18B include overviews of display screens illustrating an example of accessing a web site that was accessed in the past using the Internet access history. Referring to FIG. 18A, the user can select the second web page image 30b from web page images included in the Internet access history provided to the first area 10. The controller 180 then accesses the Internet protocol address of the second web page 40b corresponding to the selected second web page image 30b and displays the second web page 40b in the second area 20 as shown in FIG. 18B.

Further, the controller 180 can store the Internet protocol address corresponding to the second web page 40b in such a manner that the Internet protocol address corresponds to the second web page image 30b when the second web page image 30b is captured. In addition, the controller 180 can access the second web page 40b with reference to the stored Internet protocol address corresponding to the second web page image 30b when the user selects the second web page image 30b as shown in FIG. 18A.

Figure 19:
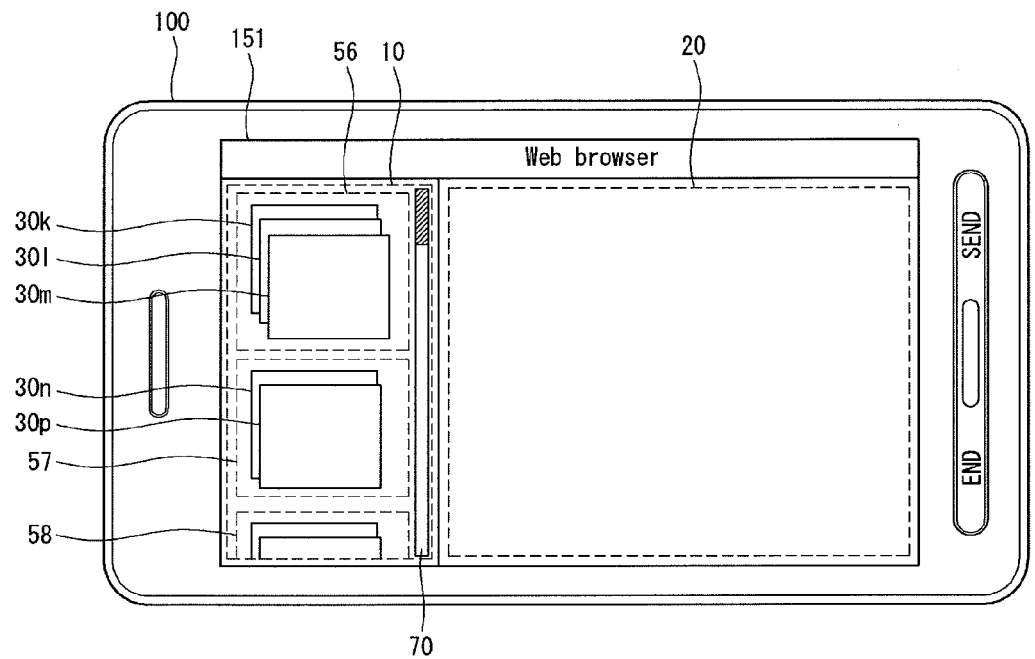
FIGS. 19 and 20A-20D are overviews of display screens showing another example of accessing a past web site using the Internet access history.

Next, FIGS. 19, 20A, 20B, 20C and 20D include overviews of display screens illustrating another example of accessing a web site that was accessed in the past using the Internet access history. In particular, FIG. 19 is a conceptional view showing an example of grouping web page images by categories according to an embodiment of the present invention.

Referring to FIG. 19, the controller 180 groups histories of web pages accessed previously or previously and currently and provide the grouped histories to the first area 10. Also, the Internet access histories shown in FIG. 19 include at least three groups 56, 57 and 58. For example, the seventh group 56 includes an eleventh web page image 30k, a twelfth web page image 30l and a thirteenth web page image 30m. The eighth group 57 includes a fourteenth web page image 30n and a fifteenth web page image 30p.

Figure 20A:
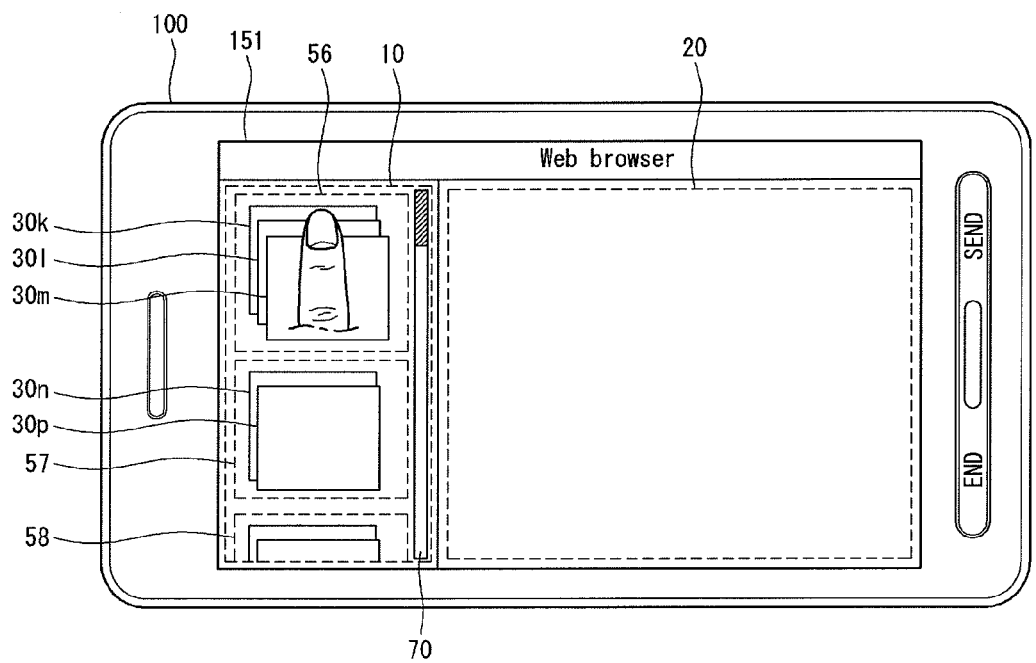

The controller 180 can then provide a scroll bar 70, as shown in FIG. 19, when all the groups provided to the first area 10 cannot be displayed as a single picture as the number of groups provided to the first area 10 increases. The user can then select a specific web page image from web page images displayed in the first area 10 as described above with reference to FIGS. 18A and 18B. Further, the user can select a specific group from the plurality of groups displayed in the first area 10. For example, the user can select the seventh group 56, as shown in FIG. 20A.

Figure 20B:
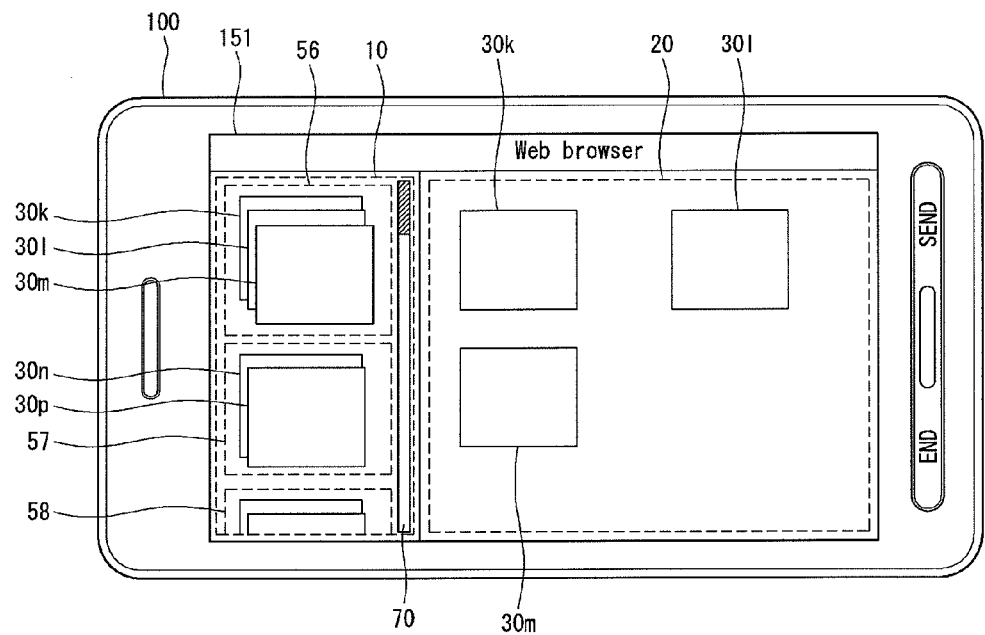
Figure 20C:
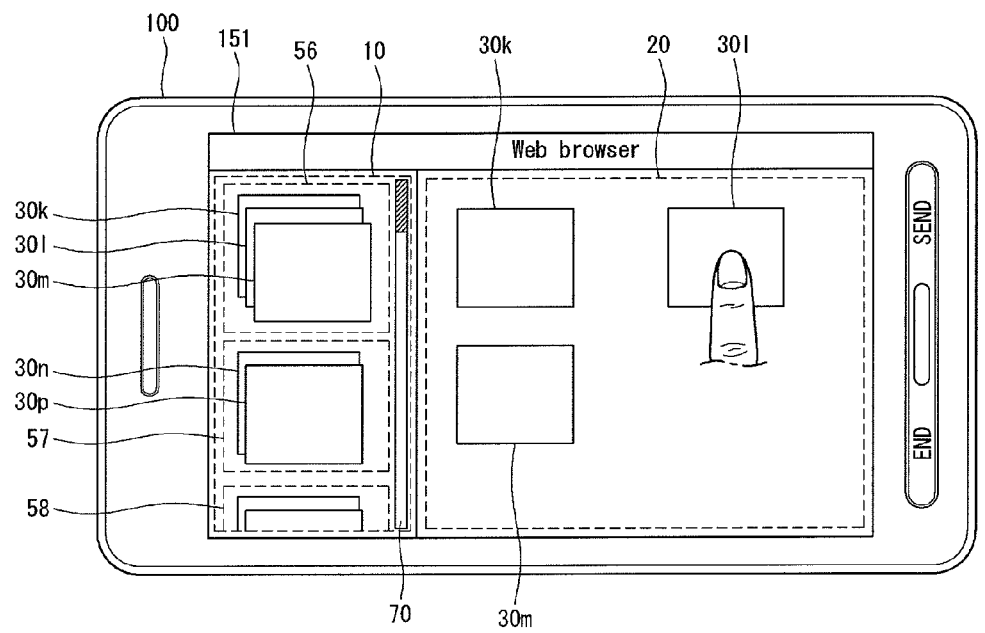

The controller 180 can also display the web page images 30k, 301 and 30m belonging to the seventh group 56 in the second area 20 as shown in FIG. 20B, as the user selects the seventh group 56. Here, the user can select a specific web page image from the web page images displayed in the second area 20. For example, the user can select the twelfth web page image 301 as shown in FIG. 20C.

Figure 20D:
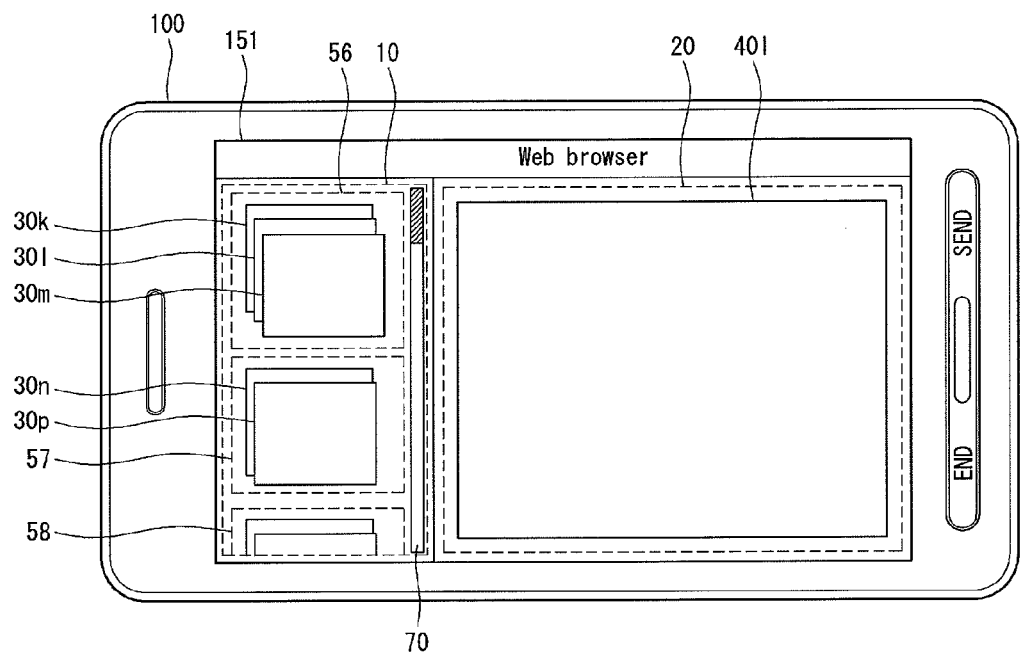

The controller 180 can also access the web page corresponding to the twelfth web page image 301 with reference to a stored Internet protocol address corresponding to the twelfth web page image 301 as the user selects the twelfth web page image 301. In addition, the controller 180 may be provided with a web page 401 corresponding to the twelfth web page image 301 and display the web page 401 in the second area 20 as shown in FIG. 20D.

Further, when an event associated with a web page corresponding to a specific web page image among the web page images displayed in the first area 10 is generated, the controller 180 can visually vary a web page image corresponding to the event.

Figure 21:
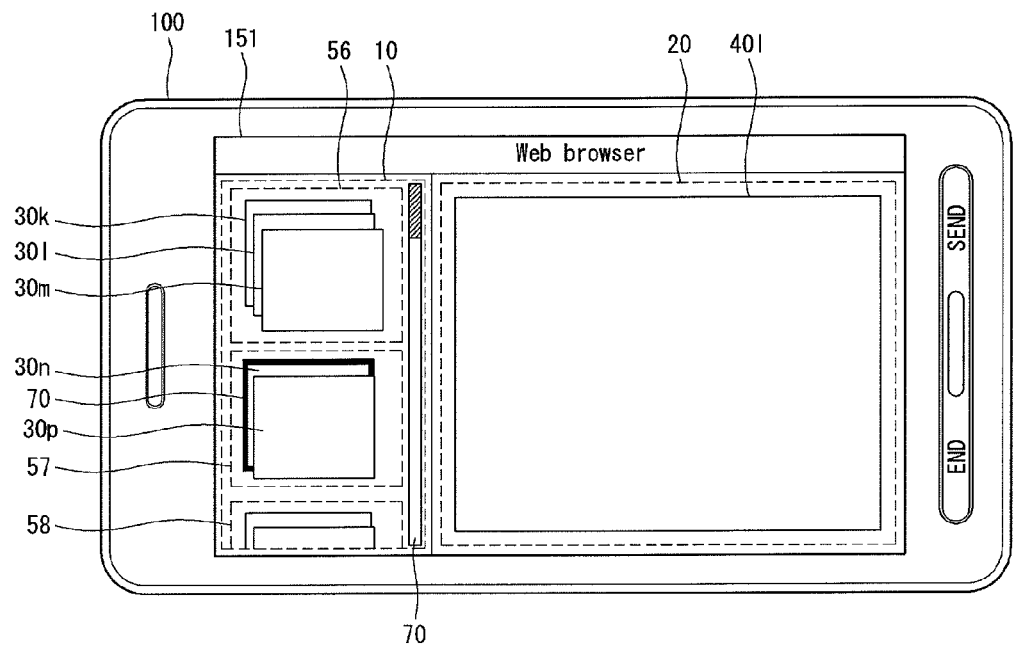
FIG. 21 is an overview of a display screen showing a visual variation in a web page image in associated with generation of an event.

Next, FIG. 21 is an overview of a display screen illustrating a visual variation in a web page image in association with generation of an event. In this example, the controller 180 downloads multimedia contents such as a motion picture from a web page corresponding to the fourteenth web page image 30n, for example. The downloading of the multimedia contents may also be executed in the background even when the currently accessed web site or web page is changed.

When the controller 180 completes the download of the multimedia contents, the controller 180 can visually emphasize the fourteenth web page image 30n corresponding to the web page associated with the download of the multimedia contents. For example, the controller 180 can highlight or flicker the fourteenth web page image 30n. The user can then see that the download of the multimedia contents associated with the fourteenth web page image 30n is finished through the visual variation in the fourteenth web page image 30n.

Various events may also be generated. For example, the above-described event may correspond to completion of downloading the data, as described above, and transmission/receiving of data to/from the web site corresponding to the web page image associated with the generation of the event, which includes transmission/receiving of a message including E-mail.

The controller 180 can also update a part or the whole of the web page images according to a predetermined standard or a predetermined command. For example, the controller 180 can provide a menu for updating the web page images and access the web pages respectively corresponding to the web page images displayed in the first area 10 sequentially or simultaneously within a range allowed by data communication performance to be provided with currently provided web pages.

Further, the controller 180 can newly provide web page images obtained by capturing the provided web pages or a representative image to the first area 10 to complete the operation of updating the web page images. Furthermore, the controller 180 can provide a menu for selecting at least one of the web page images displayed in the first area 10 and updating the selected web page image. In addition, although the aforementioned embodiments are described in association with web documents and web sites, the present invention is not limited thereto.

Figure 22:
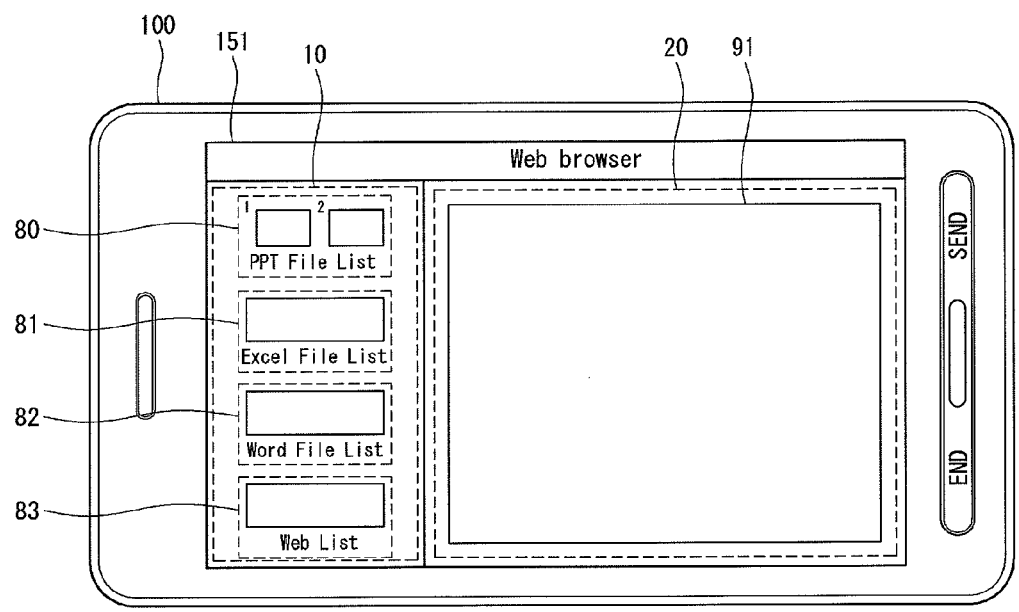
FIG. 22 is an overview of a display screen showing an example of a file access history according to an embodiment of the present invention.

Next, FIG. 22 is an overview of a display screen illustrating an example of a file access history that can be provided according to an embodiment of the present invention. Referring to FIG. 22, the controller 180 can group lists of files, accessed or opened by the user previously or currently, by types and display the lists in the first area 10. Further, the groups 80, 81, 82 and 83 shown in FIG. 22 represent sets of files having different attributes. The contents 91 displayed in the second area 20 shown in FIG. 22 may also be provided when the specific group 81 is selected from the groups displayed in the first area 10.

The aforementioned proximity sensor will now be explained in more detail with reference to FIG. 23. In particular, FIG. 23 is a conceptual diagram used for explaining a proximity depth of the proximity sensor.

Figure 23:
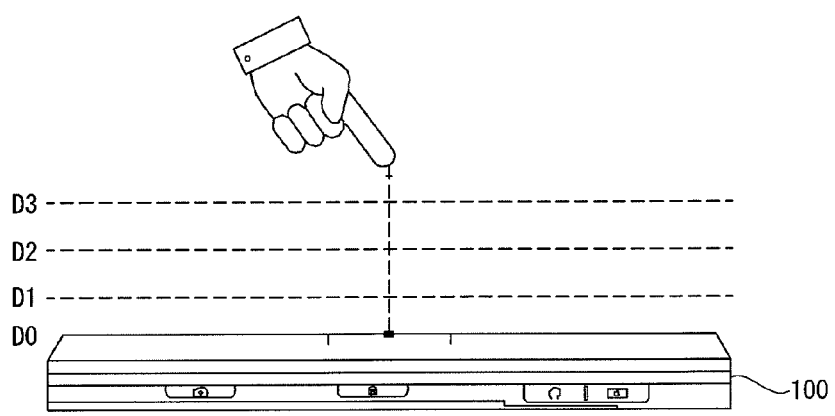
FIG. 23 is a conceptional view for explaining a proximity depth of a proximity sensor.

As shown in FIG. 23, when a pointer such as a user's finger approaches the touch screen, the proximity sensor located inside or near the touch screen senses the approach and outputs a proximity signal. Further, the proximity sensor can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 23 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 23, when the pointer (user's finger in this example) completely comes into contact with the touch screen (D0), the controller 180 recognizes this action as the contact touch. When the pointer is located within a distance D1 from the touch screen, the controller 180 recognizes this action as a proximity touch of a first proximity depth.

Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

The above described method of providing information in a mobile terminal according to the present invention can be written as computer programs and can be implemented in digital computers that execute the programs using a computer readable recording medium. The method of providing information in a mobile terminal according to embodiments of the present invention can be executed through software. The software can include code segments that perform required tasks.

Programs or code segments can also be stored in a processor readable medium and transmitted.

The computer readable recording medium includes all types of recording devices storing data readable by computer systems. Examples of the computer readable recording medium include ROM, RAM, CD-ROM, DVD±ROM, DVD-RAM, magnetic tapes, floppy disks, hard disks, and optical data storage devices. The computer readable recording medium can also be distributed over network coupled computer systems so that the computer readable code is stored and executed in a distributed fashion.

Therefore, according to the mobile terminal and corresponding method of providing information according to embodiments of the present invention, information on a history of accesses to various contents such as web pages or files, which were accessed by a user in the past, can be efficiently provided to the user. Furthermore, the user can easily recognize the contents of the access history, and thus the user can easily re-access desired contents among the contents.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal comprising:
    a display unit configured to display information;
    a wireless Internet module configured to wirelessly access the Internet; and
    a controller configured to display an Internet access history including web page images of captured web pages previously accessed through the wireless Internet module in a first area of the display unit, to group the web page images by categories, and to display the grouped web page images in the first area,
    wherein the controller is further configured to determine a number of the web pages previously accessed, to only group the web page images by categories when a number of the web page images to be displayed on the first area exceeds a predetermined number, and
    wherein the controller is further configured to group the web page images corresponding to the web pages previously accessed having a same upper Internet protocol address as the categories.

2. The mobile terminal of claim 1, wherein the controller is further configured to display a currently accessed web page in a second area of the display unit different from the first area.

3. The mobile terminal of claim 2, further comprising:
    a proximity sensor configured to sense a proximity of an external object with respect to the mobile terminal,
    wherein the controller is further configured to display the Internet access history in the first area when the proximity sensor senses the external object approaching the mobile terminal.

4. The mobile terminal of claim 2, wherein the controller is further configured to receive a selection signal indicating a web page included in the Internet access history is selected, and to access and display the selected web page in the second area of the display unit.

5. The mobile terminal of claim 2, wherein the controller is further configured to receive a selection signal indicating a group of web pages included in the Internet access history is selected, and to display web page images included in the selected group in the second area.

6. The mobile terminal of claim 5, wherein the controller is further configured to receive a selection signal indicating one of the web page images displayed in the second area is selected, and to access and display a web page corresponding to the selected web page image in the second area.

7. The mobile terminal of claim 1, wherein the controller is further configured to receive an event signal indicating an event associated with a web page corresponding to one of the web page images has been generated, and to distinctively display the web page image corresponding to the generation of the event.

8. The mobile terminal of claim 7, wherein the event corresponds to one of 1) transmission/receiving of data to/from a web site corresponding to the web page image associated with the generation of the event, 2) a data download operation and 3) transmission/receiving of a message including e-mail.

9. The mobile terminal of claim 1, wherein the controller is further configured to update at least a part of the web page images displayed in the first area by accessing the web pages corresponding to the web page images displayed in the first area according to a predetermined standard or a predetermined command.

10. The mobile terminal of claim 9, wherein the controller is configured to access the web pages corresponding to the web page images displayed in the first area sequentially or simultaneously considering data communication performance of the wireless Internet module.

11. The mobile terminal of claim 1, wherein the controller is configured to display the grouped web page images in a tree structure.

12. The mobile terminal of claim 5, wherein the controller is configured to display the group of web page images included in the Internet access history to overlap each other in the first area and to display the web page images included in the selected group not to overlap each other in the second area.

13. A method of controlling a mobile terminal, the method comprising:
    wirelessly accessing, via a wireless Internet module, the Internet;
    displaying, on a display unit of the mobile terminal, an Internet access history including web page images of captured web pages previously accessed through the wireless Internet module in a first area of the display unit;
    grouping, via a controller on the mobile terminal, the web page images by categories, and controlling the display unit to display the grouped web page images in the first area;
    determining, via a controller, a number of the webpages previously accessed; and
    only grouping, via the controller, the web page images by categories when a number of the web page images to be displayed on the first area exceeds a predetermined number,
    wherein the grouping the web page images by categories comprises grouping the web page images corresponding to the web pages previously accessed having a same upper Internet protocol address as the categories.

14. The method of claim 13, further comprising:
    displaying a currently accessed web page in a second area of the display unit different from the first area.

15. The method of claim 14, further comprising:
    sensing, via a proximity sensor, a proximity of an external object with respect to the mobile terminal;
    wherein the displaying the Internet access history displays the Internet access history in the first area when the proximity sensor senses the external object approaching the mobile terminal.

16. The method of claim 14, further comprising:
receiving a selection signal indicating a web page included in the Internet access history is selected; and
accessing and displaying the selected web page in the second area of the display unit.

17. The method of claim 14, further comprising:
receiving a selection signal indicating a group of web pages included in the Internet access history is selected; and
displaying web page images included in the selected group in the second area.

18. The method of claim 17, further comprising:
receiving a selection signal indicating one of the web page images displayed in the second area is selected; and
accessing and displaying a web page corresponding to the selected web page image in the second area.

19. The method of claim 13, further comprising:
receiving an event signal indicating an event associated with a web page corresponding to one of the web page images has been generated; and
distinctively displaying the web page image corresponding to the generation of the event.

20. The method of claim 19, wherein the event corresponds to one of 1) transmission/receiving of data to/from a web site corresponding to the web page image associated with the generation of the event and 2) a data download operation and 3) transmission/receiving of a message including e-mail.

21. A mobile terminal comprising:
a display unit configured to display information;
a wireless Internet module configured to wirelessly access the Internet; and
a controller configured to display an Internet access history including web page images of captured web pages previously accessed through the wireless Internet module in a first area of the display unit, to group the web page images by categories, and to display the grouped web page images in the first area,
wherein the controller is further configured to determine a number of the web pages previously accessed to only group the web page images by categories when a number of the web page images to be displayed on the first area exceeds a predetermined number, and
wherein the controller is configured to group the web page images corresponding to the web pages previously accessed having a same access route initiated from a specific web page as the categories.

22. A method of controlling a mobile terminal, the method comprising:
wirelessly accessing, via a wireless Internet module, the Internet;
displaying, on a display unit of the mobile terminal, an Internet access history including web page images of captured web pages previously accessed through the wireless Internet module in a first area of the display unit;
grouping, via a controller on the mobile terminal, the web page images by categories, and controlling the display unit to display the grouped web page images in the first area;
wherein determining, via the controller, a number of the webpages previously accessed; and
only grouping the web page images by categories when a number of the web page images to be displayed on the first area exceeds a predetermined number,
wherein the grouping the web page images by categories comprises grouping the web page images corresponding to the web pages previously accessed having a same access route initiated from a specific web page as the categories.

* * * * *